United States Patent
Shih et al.

(10) Patent No.: US 12,176,747 B2
(45) Date of Patent: Dec. 24, 2024

(54) CHARGING DEVICE AND CHARGING METHOD THEREOF

(71) Applicant: ASUSTEK COMPUTER INC., Taipei (TW)

(72) Inventors: Chia-Jui Shih, Taipei (TW); Kai-Chun Liang, Taipei (TW); Chia-Yu Liu, Taipei (TW); Kian-Ming Chee, Taipei (TW); Yii-Lin Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/830,136

(22) Filed: Jun. 1, 2022

(65) Prior Publication Data

US 2023/0100024 A1 Mar. 30, 2023

(30) Foreign Application Priority Data

Sep. 28, 2021 (TW) ................................ 110135976

(51) Int. Cl.
*H02J 7/00* (2006.01)

(52) U.S. Cl.
CPC ........ *H02J 7/00712* (2020.01); *H02J 7/0013* (2013.01); *H02J 7/0048* (2020.01)

(58) Field of Classification Search
CPC ..... H02J 7/00712; H02J 7/0048; H02J 7/0013
See application file for complete search history.

(56) References Cited

U.S. PATENT DOCUMENTS

| 2013/0271080 A1* | 10/2013 | Yoshida | .................. B60L 58/12 |
| | | | 320/109 |
| 2021/0242704 A1* | 8/2021 | Lim | ....................... B60L 53/62 |

FOREIGN PATENT DOCUMENTS

| CN | 102938573 B | 8/2004 | |
| CN | 206041530 U | 3/2017 | |
| CN | 109768599 A | * 5/2019 | ............ H01M 10/44 |
| CN | 111049226 A | 4/2020 | |
| CN | 111525635 A | 8/2020 | |
| CN | 211295590 U | 8/2020 | |

* cited by examiner

*Primary Examiner* — Lincoln D Donovan
*Assistant Examiner* — James G Yeaman
(74) *Attorney, Agent, or Firm* — MUNCY, GEISSLER, OLDS & LOWE, P.C.

(57) ABSTRACT

A charging device connected to a power source for charging a plurality of electronic devices is provided. Each of the electronic devices has a predetermined charging power. The charging device comprises a power input end, a plurality of power output ends, a plurality of charging units, and a controller. The power input end is connected to the power source. The power output ends are utilized to connect the electronic devices. The charging units are electrically connected to the power output ends respectively. The controller is electrically connected to the power input end, the power output ends and the charging units for accessing an output power of the power source via the power input and each of the predetermined charging powers via the power output ends, and controlling the charging units according to the output power and the predetermined charging powers.

11 Claims, 9 Drawing Sheets

CHARGING DEVICE AND CHARGING METHOD THEREOF

CROSS-REFERENCE TO RELATED APPLICATION

This application claims the priority benefit of Taiwan Application Serial No. 110135976, filed on Sep. 28, 2021. The entirety of the above-mentioned patent application is hereby incorporated by reference herein and made a part of the specification.

BACKGROUND OF THE INVENTION

Field of the Invention

The disclosure relates to a charging technology, and in particular, to a charging device and a charging method thereof for charging a plurality of devices.

Description of the Related Art

With the popularization of electronic products, the number of portable electronic devices (such as smart phones, tablets, cameras, etc.) owned by individuals is also increasing. All of the portable electronic devices need to be charged to operate.

Limited by the number of charging interfaces in a home, a user often needs to take turns to charge the portable electronic devices. As a result, not only the charging time is increased, but also the user has to frequently check during the charging process whether the electronic devices are fully charged in order to change the electronic device for charging.

BRIEF SUMMARY OF THE INVENTION

The disclosure provides a charging device, configured to be connected to a power source for charging a plurality of electronic devices. Each of the electronic devices has a predetermined charging power. The charging device includes a power input end, a plurality of power output ends, a plurality of charging units, and a controller. The power input end is configured to be connected to the power source. The power output ends are configured to be connected to the electronic devices. The charging units are electrically connected to the power output ends respectively for charging the electronic devices. The controller is electrically connected to the power input end, the power output ends, and the charging units for accessing an output power of the power source via the power input end and accessing the predetermined charging powers via the power output ends, and controlling the charging units according to the output power and the predetermined charging powers.

The disclosure also provides a charging method, where a plurality of electronic devices is charged using a power source through a charging device, and each of the electronic devices includes a predetermined charging power. The charging method includes: accessing an output power of the power source; confirming electronic devices that have been connected to the charging device and accessing predetermined charging powers thereof; and adjusting actual charging powers for the electronic devices according to the output power and the predetermined charging powers.

According to the charging device and the charging method provided in the disclosure, a plurality of electronic devices is charged simultaneously, and an output power of a power source is effectively used. In this way, a charging power is effectively allocated to each of the electronic devices to shorten a charging time.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
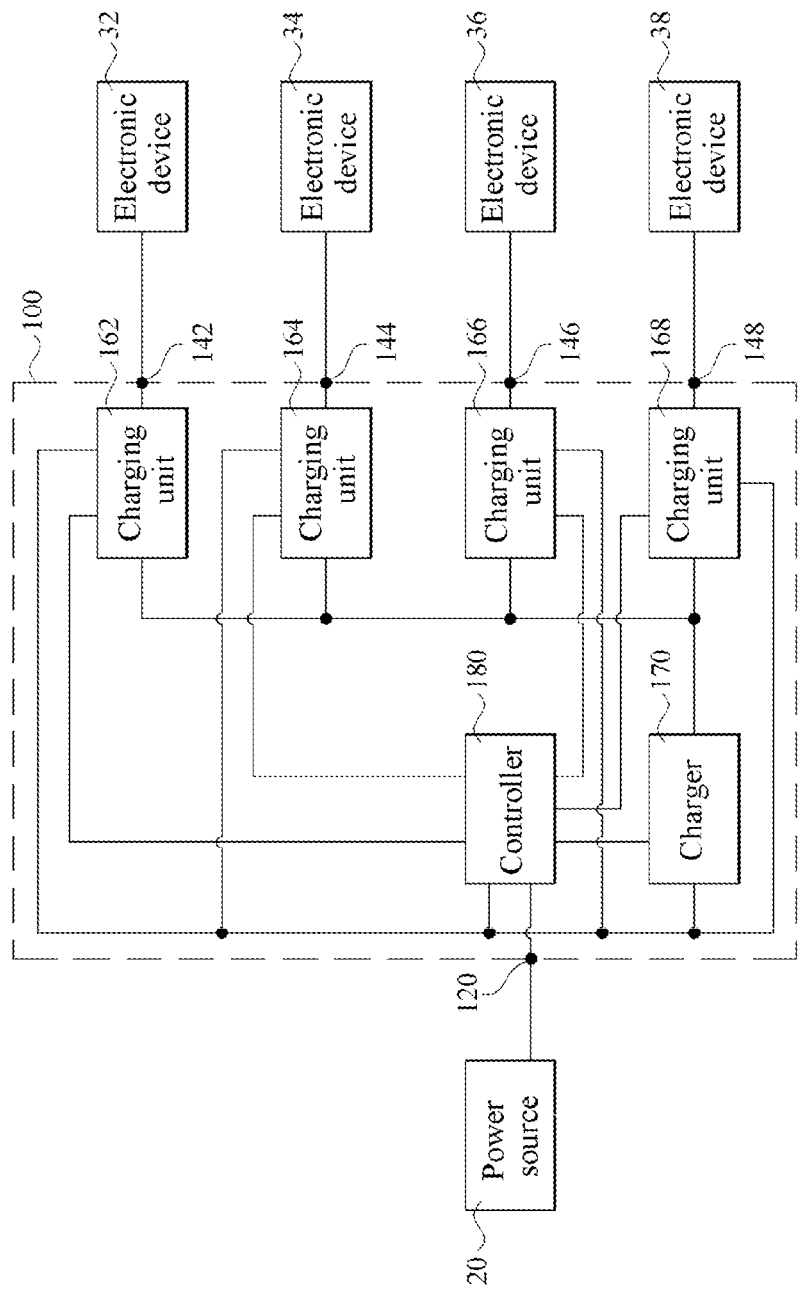
FIG. 1 is a schematic block diagram of a charging device according to an embodiment of the disclosure.

FIG. 1 is a schematic block diagram of a charging device according to an embodiment of the disclosure. The charging device 100 is configured to be connected to a power source 20 for charging a plurality of electronic devices 32, 34, 36, and 38. The charging device 100 in the figure is designed to be connected to four electronic devices 32, 34, 36, and 38 for charging. The electronic devices 32, 34, 36, and 38 are portable electronic devices such as a smart phone, a tablet, and a camera.

As shown in the figure, the charging device 100 includes a power input end 120, a plurality of power output ends 142, 144, 146, and 148, a plurality of charging units 162, 164, 166, and 168, and a controller 180.

The power input end 120 is configured to be detachably connected to the power source 20. In an embodiment, the power source 20 is an adaptor and is configured to convert utility power into electric energy required for charging and provide the electric energy to the power input end 120. The power output ends 142, 144, 146, and 148 are configured to be detachably connected to the electronic devices 32, 34, 36, and 38. In an embodiment, the power output ends 142, 144, 146, and 148 are universal serial bus (USB) connecting ports and are configured to be connected to the electronic devices 32, 34, 36, and 38 with USB connectors for charging.

Each of the power output ends 142, 144, 146, and 148 corresponds to one of the charging units 162, 164, 166, and 168. The charging units 162, 164, 166, and 168 are electrically connected to the power input end 120 for obtaining the electrical energy, and are electrically connected to the corresponding power output ends 142, 144, 146, and 148 respectively for charging the electronic devices 32, 34, 36, and 38 inserted into the power output ends. In an embodiment, front ends of the charging units 162, 164, 166, and 168 are connected to a charger 170 in parallel. The charger 170 is electrically connected to the power input 120 and is configured to allocate a charging power provided by the power source 20 to the charging units 162, 164, 166, and 168.

The controller 180 is electrically connected to the power input end 120, the power output ends 142, 144, 146, and 148, and the charging units 162, 164, 166, and 168. The controller 180 communicates with the power source 20 via the power input end 120 for accessing an output power of the power source 20, and communicates with the corresponding electronic devices 32, 34, 36, and 38 via the power output ends 142, 144, 146, and 148 for accessing predetermined charging powers for the electronic devices 34, 34, 36, and 38. In an embodiment, the aforementioned predetermined charging powers are the highest charging powers supported by the electronic devices 32, 34, 36, and 38.

The controller 180 controls operations of the charging units 162, 164, 166, and 168 according to a predetermined control logic by using the output power and the predetermined charging powers corresponding to the electronic devices 32, 34, 36, and 38. The predetermined control logic will be described in more detail in the subsequent paragraphs corresponding to FIG. 2 to FIG. 6.

A quantity of power output ends 142, 144, 146, and 148 and a quantity of charging units 162, 164, 166, and 168 in the disclosure depend on an actual demand. In this embodiment, the charging device 100 is provided with four power output ends 142, 144, 146, and 148 and four charging units 162, 164, 166, and 168 corresponding to the four power output ends 142, 144, 146, and 148 respectively, to support up to four electronic devices 32, 34, 36, and 38.

In this embodiment, the four power output ends 142, 144, 146, and 148 are all connected to the corresponding electronic devices 32, 34, 36, and 38. It indicates that the charging device 100 in the disclosure supports up to four electronic devices to be connected simultaneously for charging. According to an actual situation, a quantity of connected electronic devices 32, 34, 36, and 38 is less than the quantity of power output ends 142, 144, 146, and 148, or some of the power output ends 142, 144, 146, and 148 are not connected to the electronic devices 32, 34, 36, and 38.

In this case, the controller 180 confirms whether the power output ends 142, 144, 146, and 148 are connected to the electronic devices 32, 34, 36, and 38 according to reply signals from the electronic devices 32, 34, 36, and 38, and further controls operations of the corresponding charging units 162, 164, 166, and 168 according to a predetermined control logic. In an embodiment, when the controller 180 receives only the reply signals corresponding to the power output ends 142 and 144, the controller 180 confirms that only the power output ends 142 and 144 are connected to the electronic devices 32 and 34, and controls the corresponding charging units 162 and 164 to charge the electronic devices 32 and 34 according to a predetermined control logic.

FIG. 2 to FIG. 6 illustrate a predetermined control logic of a controller 180 in FIG. 1 for charging units 162, 164, 166, and 168 in different embodiments.

In a first embodiment, when an output power of the power source 20 is greater than or equal to a sum of predetermined charging powers for the electronic devices 32, 34, 36, and 38, the charging device 100 controls the corresponding charging units 162, 164, 166, and 168 to perform charging according to the predetermined charging powers for the electronic devices 32, 34, 36, and 38.

Figure 2:
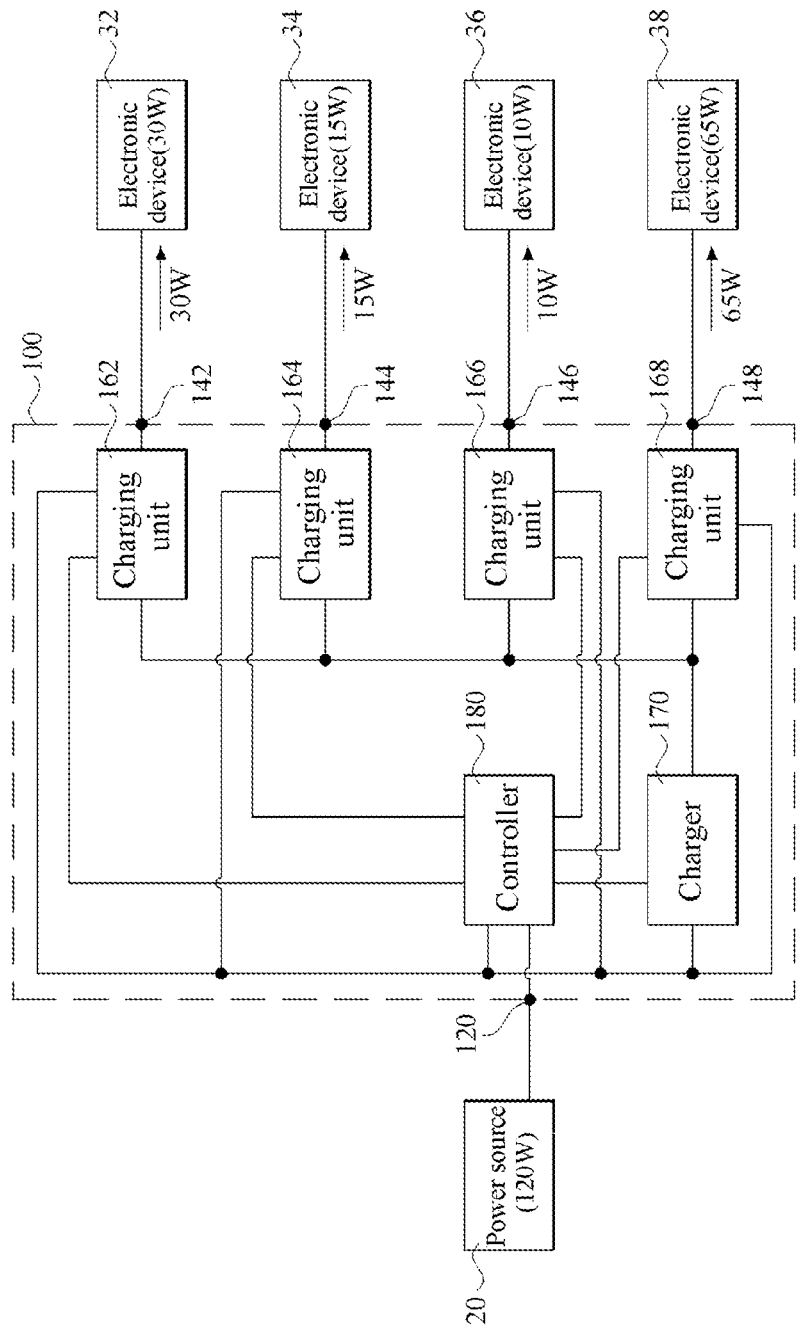
FIG. 2 to FIG. 6 illustrate a predetermined control logic of a controller in FIG. 1 for charging units in different embodiments.

Referring to FIG. 2. As shown in FIG. 2, the output power of the power source 20 is 120 W. The predetermined charging powers for the electronic devices 32, 34, 36, and 38 are respectively 30 W, 15 W, 10 W, and 65 W, and the sum of the predetermined charging powers is 120 W, which is equal to the output power of the power source 20. In this case, the power source 20 simultaneously charges the electronic devices 32, 34, 36, and 38 according to the predetermined charging powers for the electronic devices 32, 34, 36, and 38.

In a second embodiment, when an output power of the power source 20 is less than a sum of predetermined charging powers for the electronic devices 32, 34, 36, and 38, the charging device 100 preferentially charges the electronic devices 32, 34, 36, and 38 with the predetermined charging powers.

Figure 3:
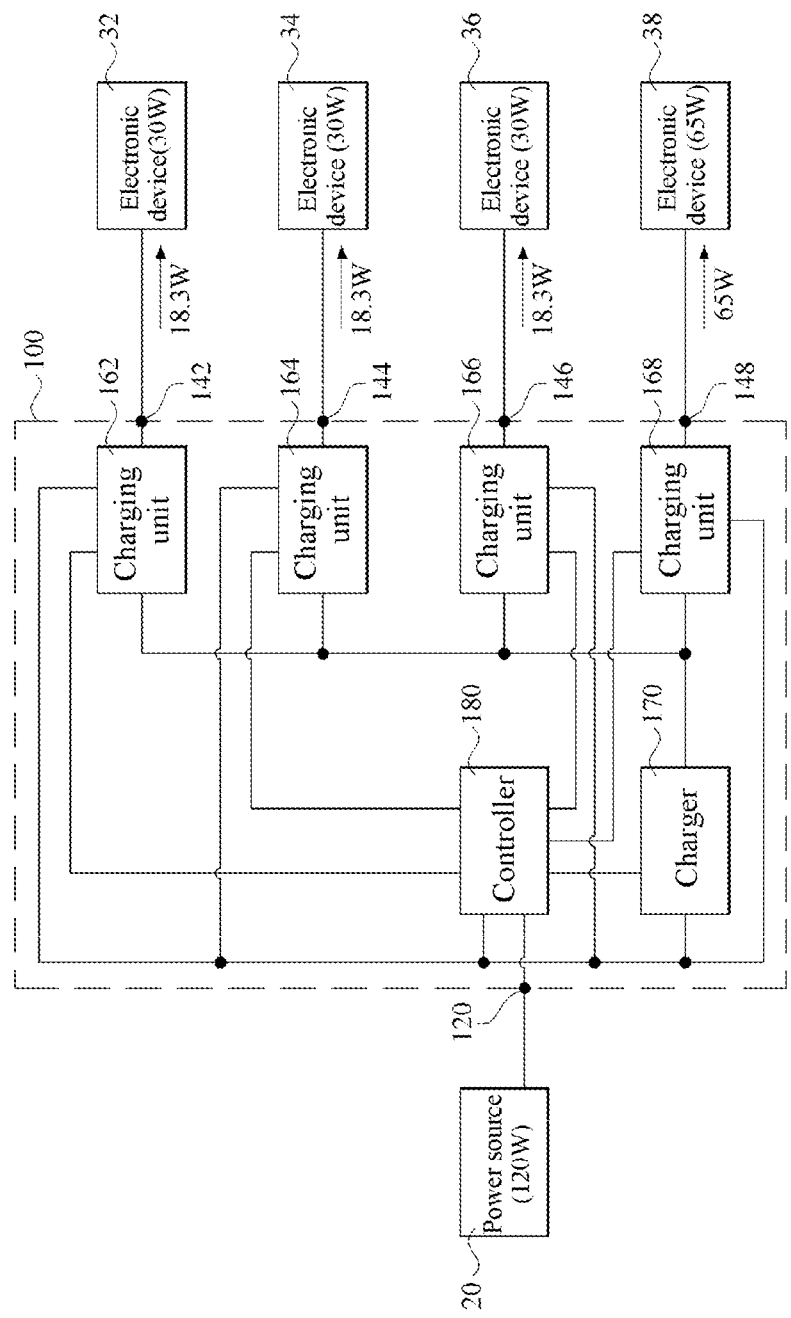

Referring to FIG. 3. As shown in FIG. 3, the output power of the power source 20 is 120 W. The predetermined charging powers for the electronic devices 32, 34, 36, and 38 are respectively 30 W, 30 W, 30 W, and 65 W, and the sum of the predetermined charging powers is 155 W. That is, the output power of the power source 20 is less than the sum of the predetermined charging powers for the electronic devices 32, 34, 36, and 38.

In this case, the charging device 100 will preferentially charge the electronic device 38 with the highest predetermined charging power among the electronic devices 32, 34, 36, and 38, to improve the charging efficiency.

In an embodiment, when an output power of the power source 20 is less than a sum of predetermined charging powers for the electronic devices 32, 34, 36, and 38, the charging device 100 divides the output power into a preferential charging power and a remaining charging power, where the preferential charging power is equal to the highest predetermined charging power for the electronic devices 32, 34, 36, and 38 and is used for charging the electronic device 38 with the highest predetermined charging power, and the remaining charging power is equally allocated to other electronic devices 32, 34, and 36 except the electronic device 38 with the highest predetermined charging power, so as to effectively utilize the output power of the power source 20 and improve the charging efficiency.

In an embodiment of FIG. 3, the charging device 100 divides an output power (120 W) of the power source 20 into a preferential charging power (65 W) and a remaining charging power (55 W). The preferential charging power is used for charging the electronic device 38 with the highest predetermined charging power (65 W), and the remaining charging power is equally allocated to other three electronic devices 32, 34, and 36 with each electronic device sharing 18.3 W. When the electronic device 38 with the highest predetermined charging power is about to finish charging, there is a drop in a consumption power thereof. In this case, an extra power is allocated to other electronic devices 32, 34, and 36 in charging, so that the electronic devices 32, 34, and 36 are charged with the predetermined charging powers thereof.

As mentioned above, the charging device of this embodiment preferentially charges only the electronic device 38 with the highest predetermined charging power, but is not limited thereto. In another embodiment, when an output power provided by the power source 20 is sufficient to support simultaneous charging of a plurality of electronic devices 32, 34, 36, and 38, a preferential charging power is also estimated by using a sum of the highest predetermined charging power and the second highest predetermined charging power, and the electronic devices 32, 34, 36, and 38 with the highest predetermined charging power and the second highest predetermined charging power are preferentially charged.

In an embodiment, when an output power of a power source is 120 W, the highest predetermined charging power and the second highest predetermined charging power are 65 W and 30 W respectively, 95 W will be allocated first as a preferential charging power, and the remaining 25 W will be equally allocated to the remaining electronic devices as a remaining charging power.

In this embodiment, the remaining charging power is equally allocated to other electronic devices 32, 34, and 36 for charging, but is not limited thereto. In another embodiment, the remaining charging power is also allocated according to the predetermined charging powers for other electronic devices 32, 34, and 36. In an embodiment, if the remaining charging power is 55 W, and the predetermined charging powers for the three electronic devices to which the remaining charging powers need to be allocated are 30 W, 60 W, and 20 W respectively, the charging device will allocate the remaining charging power to the three electronic devices with 15 W, 30 W, and 10 W.

In a third embodiment, when the charging device 100 receives a preferential charging signal S1 corresponding to one of the electronic devices 32, 34, 36, and 38, and the electronic device corresponding to the preferential charging signal S1 is not an electronic device with the highest predetermined charging power, the charging device 100 prioritizes the electronic device corresponding to the preferential charging signal S1 before the electronic device with the highest predetermined charging power.

Figure 4:
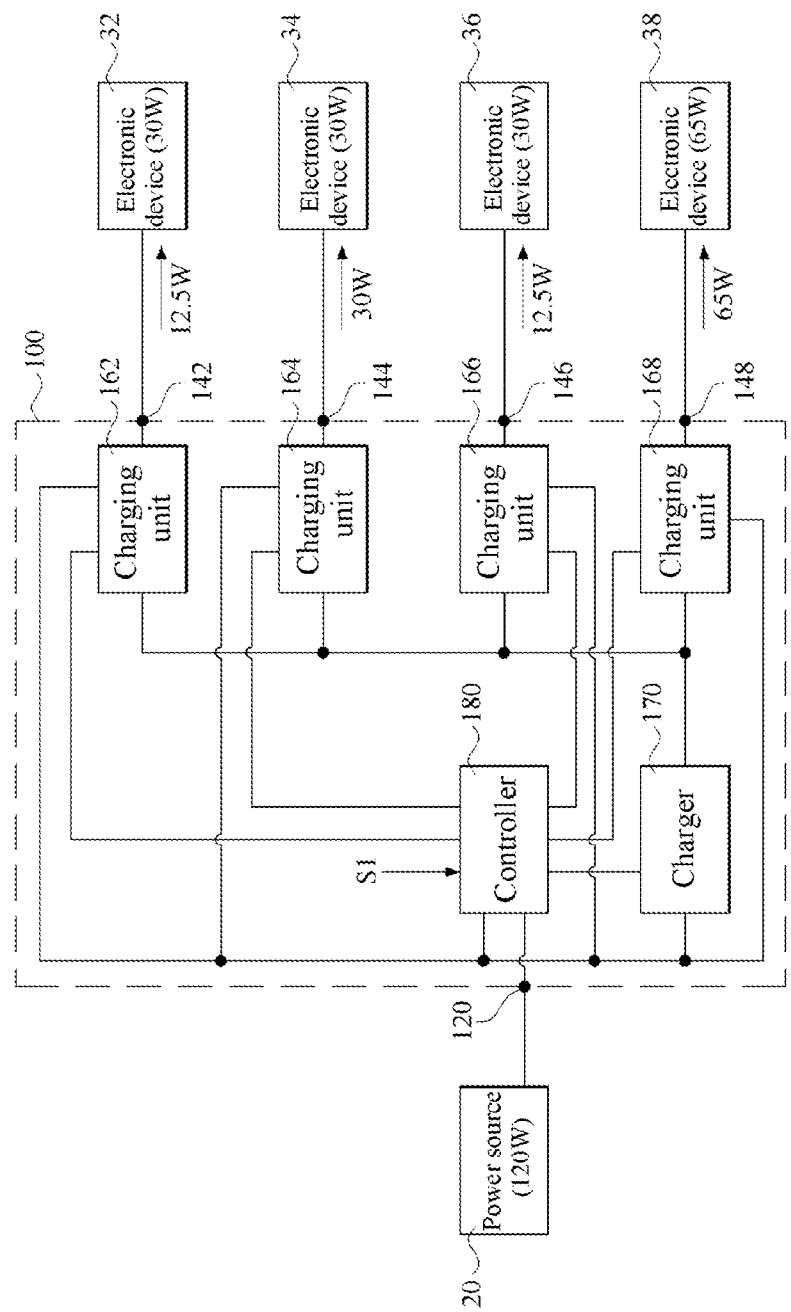

Referring to FIG. 4. As shown in FIG. 4, an output power of the power source 20 and predetermined charging powers for the electronic devices 32, 34, 36, and 38 are the same as that in the embodiment of FIG. 3. However, the charging device 100 receives the preferential charging signal S1 corresponding to the electronic device 34. Because the electronic device 34 is not the electronic device 38 with the highest predetermined charging power, the charging device 100 prioritizes the electronic device 34 corresponding to the preferential charging signal S1 before the electronic device 38 with the highest predetermined charging power and performs preferential charging thereon.

In an embodiment, the charging device 100 divides a preferential charging power (30 W) from an output power of the power source 20 according to a predetermined charging power for the electronic device 34 corresponding to the preferential charging signal S1 and provides the preferential charging power to the electronic device 34 for charging. In an embodiment, if the power source 20 includes a sufficient output power, the charging device 100 divides a preferential charging power from an output power of the power supply 20 by using a sum of predetermined charging powers for the electronic devices 34 and 38, i.e., 30 W plus 65 W, provides the preferential charging power to the electronic devices 34 and 38 for charging, and allocates a remaining charging power equally to other electronic devices 32 and 36. The embodiment in the figure adopts the latter.

In a fourth embodiment, when an output power of the power source 20 is less than a sum of predetermined charging powers for the electronic devices 32, 34, 36, and 38, and none of the electronic devices 32, 34, 36, and 38 includes the highest predetermined charging power, remaining powers of the electronic devices 32, 34, 36, and 38 are used as a basis for determining allocated charging powers.

Figure 5:
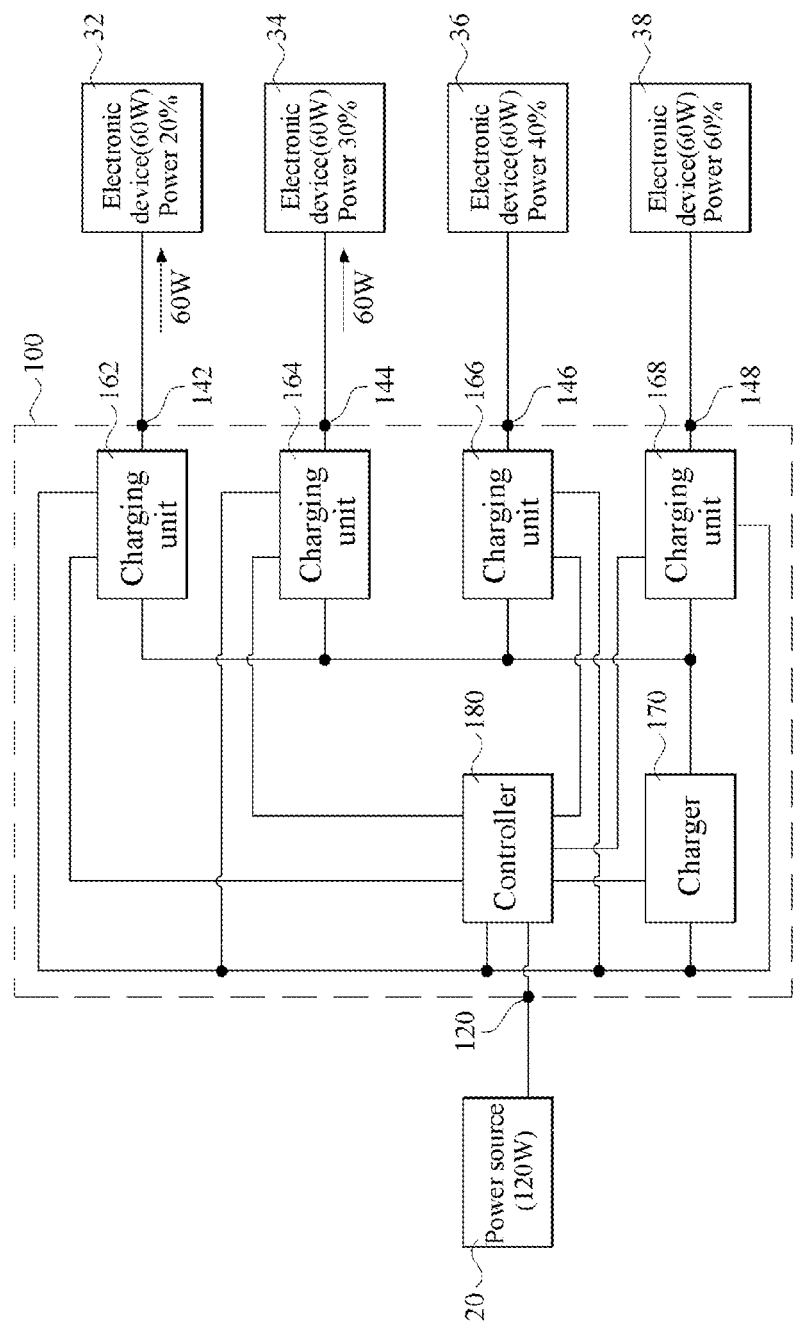

Referring to FIG. 5. As shown in FIG. 5, the output power of the power source 20 is 120 W. The predetermined charging powers for the electronic devices 32, 34, 36, and 38 are all 60 W, and the sum of the predetermined charging powers is 240 W. The output power of the power source 20 is less than the sum of the predetermined charging powers for the electronic devices 32, 34, 36, and 38, and the predetermined charging powers for the electronic devices 32, 34, 36, and 38 are the same. Remaining powers of the electronic devices are 20%, 30%, 40%, and 60% respectively. The aforementioned remaining power is expressed as a percentage, and a full charge is 100%.

In an embodiment, the charging device 100 divides an output power of the power source 20 into a preferential charging power and a remaining charging power. The preferential charging power is used for charging the electronic devices 32 and 34 with the lowest remaining power and the second lowest remaining power. The remaining charging power is equally allocated to other electronic devices 36 and 38.

In an embodiment of FIG. 5, the charging device 100 divides an output power (120 W) of the power source 20 into a preferential charging power and a remaining charging power. A sum of predetermined charging powers for the electronic devices 32 and 34 with the lowest remaining power (20%) and the second lowest remaining power (30%) is 120 W, which is equal to the output power of the power source 20. Therefore, the remaining charging power that is divided by the charging device 100 is zero. The charging device 100 preferentially charges the electronic devices 32 and 34, and does not charge the electronic devices 36 and 38 temporarily.

In this embodiment, the preferential charging power is estimated by using the sum of the predetermined charging powers for the electronic devices 32 and 34 with the lowest remaining power and the second lowest remaining power, but is not limited thereto. According to an actual situation, the preferential charging power is estimated by using a difference between the output power of the power source 20 and a predetermined charging power for each of the electronic devices 32, 34, 36, and 38. In another embodiment, the preferential charging power is also estimated by using only a predetermined charging power for the electronic device 32 with the lowest remaining power, or using predetermined charging powers for three or more electronic devices with relatively low remaining powers.

In a fifth embodiment, when an output power of the power source 20 is less than a sum of predetermined charging powers for the electronic devices 32, 34, 36, and 38, and none of the electronic devices 32, 34, 36, and 38 includes the highest predetermined charging power and the lowest remaining power, charging is performed according to a predetermined charging sequence.

Figure 6:
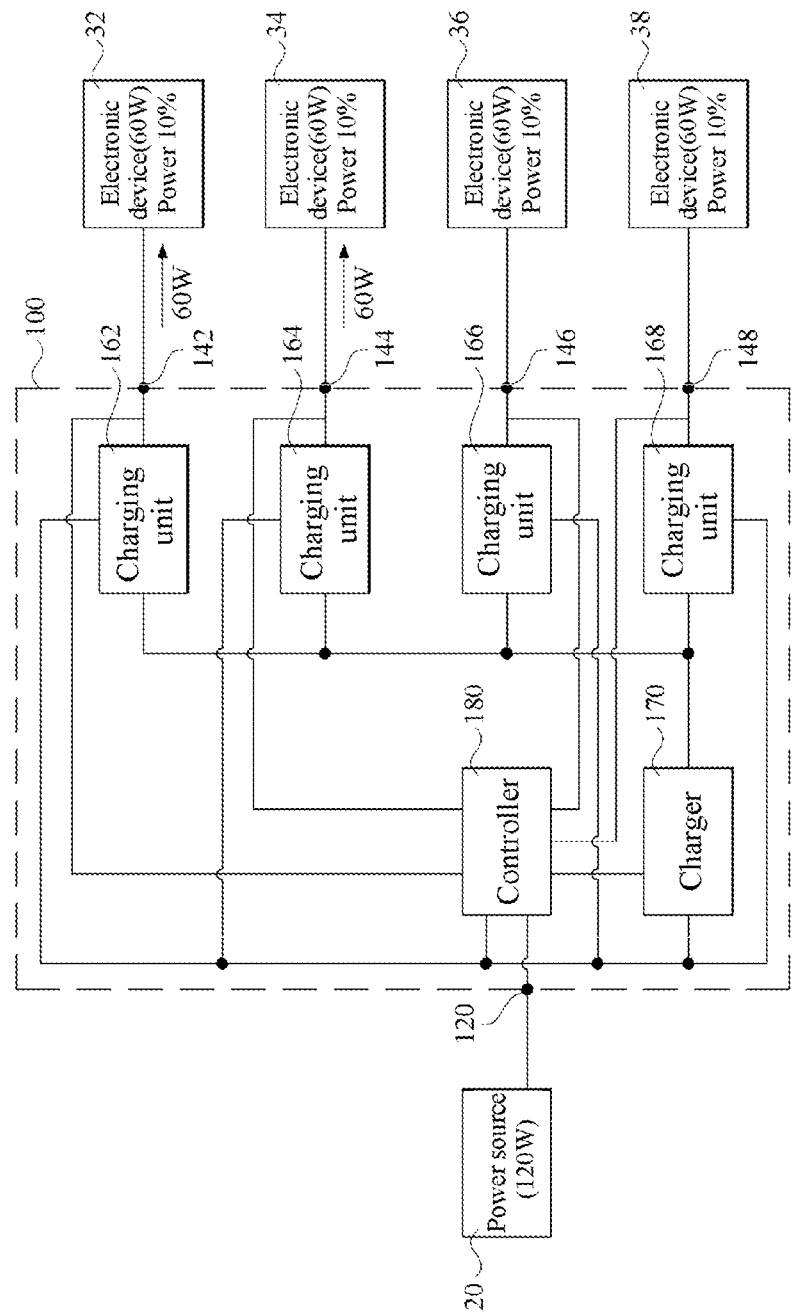

Referring to FIG. 6. As shown in FIG. 6, the output power of the power source 20 is 120 W. The predetermined charging powers for the electronic devices 32, 34, 36, and 38 are all 60 W, and the sum of the predetermined charging powers is 240 W. The output power of the power source 20 is less than the sum of the predetermined charging powers for the electronic devices 32, 34, 36, and 38, the predetermined charging powers for the electronic devices 32, 34, 36, and 38 are the same, and the remaining powers of the electronic devices 32, 34, 36, and 38 are all 10%.

Unlike the embodiment of FIG. 5, there is no single electronic device with the lowest remaining power in this embodiment. In this case, the charging device 100 charges the electronic devices 32, 34, 36, and 38 according to a predetermined charging sequence. In an embodiment, the charging device 100 divides the output power of the power source 20 into a preferential charging power and a remaining charging power. The preferential charging power is used for charging the first two electronic devices in the predetermined charging sequence. The remaining charging power is then equally allocated to other electronic devices.

In an embodiment of FIG. 6, it is assumed that the predetermined charging sequence is an order from top to bottom in the figure. The charging device 100 uses a sum of the predetermined charging powers for the first two electronic devices 32 and 34 in the predetermined charging sequence as the preferential charging power.

In the embodiment of FIG. 6, the sum of the predetermined charging powers for the two electronic devices 32 and 34 is 120 W, which is equal to the output power of the power source 20. Therefore, the remaining charging power that is divided by the charging device 100 is zero. The charging device 100 preferentially charges the electronic devices 32 and 34 and does not charge other electronic devices 36 and 38 temporarily. When the electronic devices 32 and 34 are about to finish charging, there is a drop in a consumption power thereof. In this case, an extra power is then allocated to the electronic devices 36 and 38 for charging.

Figure 7:
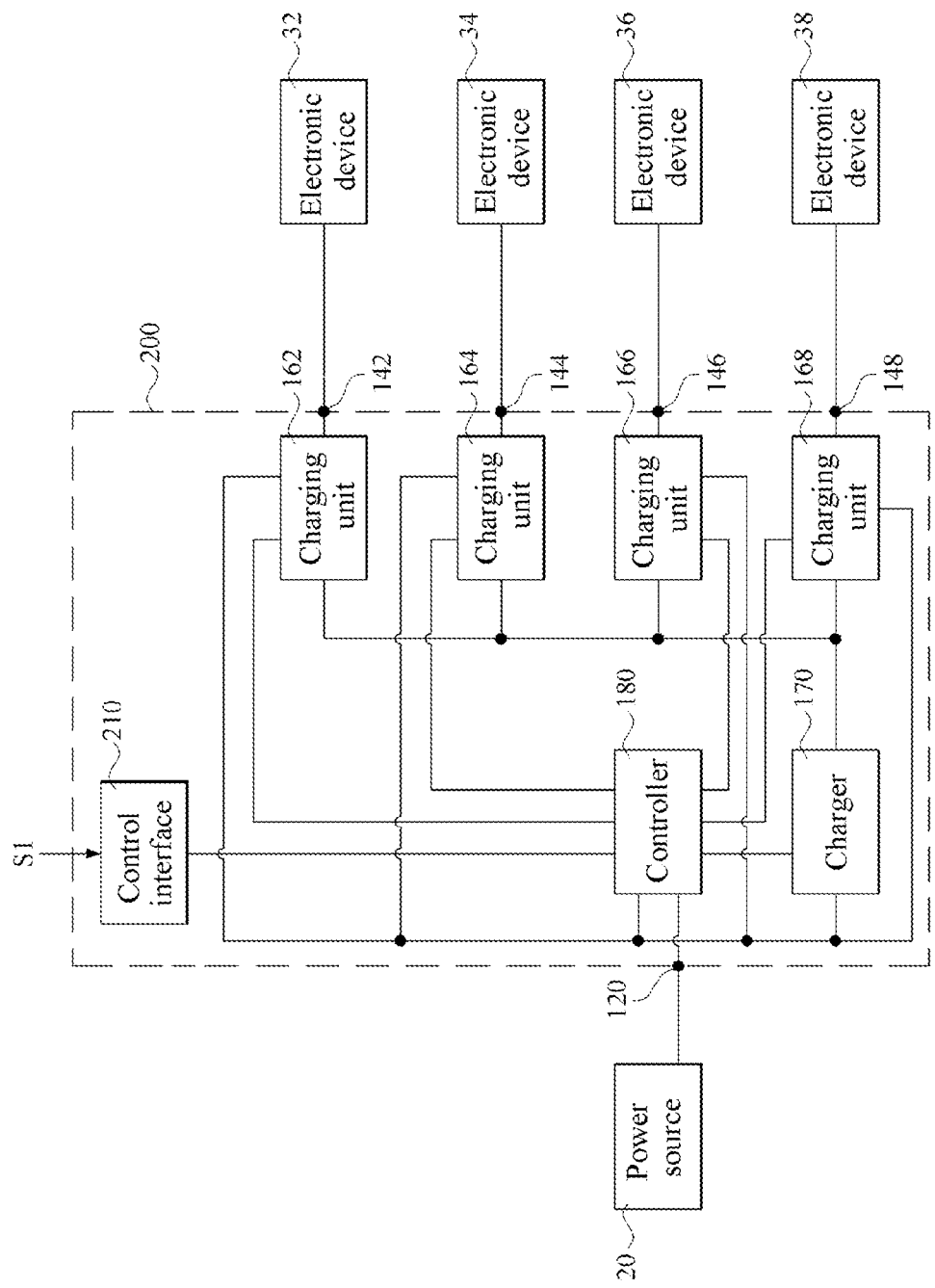
FIG. 7 is a schematic block diagram of a charging device according to another embodiment of the disclosure.

FIG. 7 is a schematic block diagram of a charging device according to another embodiment of the disclosure. Compared with the embodiment of FIG. 1, a charging device 200 of this embodiment further includes a control interface 210. The control interface 210 is configured to receive a preferential charging signal S1 corresponding to a specific electronic device, so as to perform a charging control in aforementioned FIG. 4. In an embodiment, the control interface 210 includes a touch screen.

Figure 8:
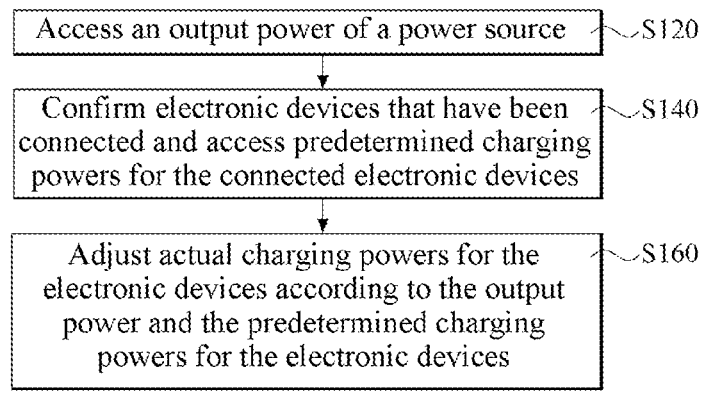
FIG. 8 is a flowchart of a charging method according to an embodiment of the disclosure.

FIG. 8 is a flowchart of a charging method according to an embodiment of the disclosure. The charging method is applicable to the charging device 100 shown in FIG. 1. A power source 20 is configured to charge a plurality of electronic devices 32, 34, 36, and 38. The charging method includes the following steps.

First, as described in step S120, an output power of the power source 20 is accessed. Subsequently, as described in step S140, electronic devices 32, 34, 36, and 38 that have been connected are confirmed and predetermined charging powers for the connected electronic devices 32, 34, 36, and 38 are accessed. Subsequently, as described in step S160, actual charging powers for the electronic devices 32, 34, 36, and 38 are adjusted according to the output power and the predetermined charging powers for the electronic devices 32, 34, 36, and 38. In an embodiment, in step 160, the actual charging powers for the electronic devices 32, 34, 36, and 38 are adjusted according to the aforementioned embodiments in FIG. 2 to FIG. 6.

Figure 9:
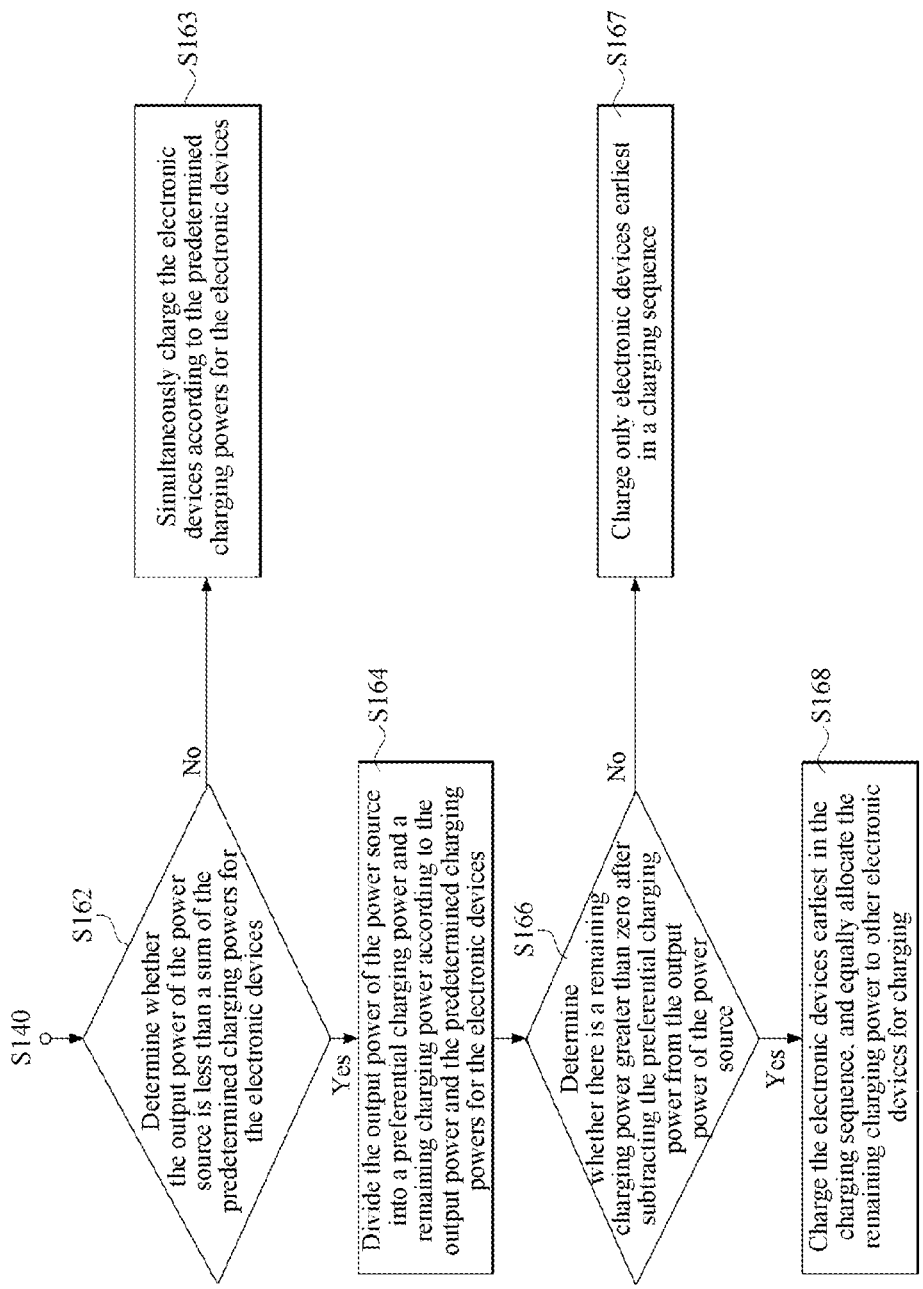
FIG. 9 is a flowchart of an embodiment of step S160 in FIG. 8.

FIG. 9 is a flowchart of an embodiment of step S160 in FIG. 8.

As shown in the figure, following step S140, after the output power of the power source 20 and the predetermined charging powers of the connected electronic devices 32, 34, 36, and 38 are accessed, as described in step S162, it is determined whether the output power of the power source 20 is less than a sum of the predetermined charging powers for the electronic devices 32, 34, 36, and 38. If the output power of the power source is not less than the sum of the predetermined charging powers for the electronic devices, the process goes forward to step S163 for simultaneously charging the electronic devices 32, 34, 36, and 38 according to the predetermined charging powers for the electronic devices 32, 34, 36, and 38 (which corresponds to the embodiment of FIG. 2).

When the output power of the power source 20 is less than the sum of the predetermined charging powers for the electronic devices 32, 34, 36, and 38, the process goes forward to step S164 for dividing the output power of the power source 20 into a preferential charging power and a remaining charging power according to the output power and the predetermined charging powers for the electronic devices 32, 34, 36, and 38. The preferential charging power is provided to one or more electronic devices earliest in a charging sequence.

For calculation of the preferential charging power, in an embodiment, a predetermined charging power for an electronic device with the highest predetermined charging power is used as the preferential charging power (which corresponds to the embodiment of FIG. 3), or a sum of predetermined charging powers for electronic devices with the highest predetermined charging power and the second highest predetermined charging power is calculated as the preferential charging power (which corresponds to the embodiment of FIG. 3), or a predetermined charging power for an electronic device corresponding to a preferential charging signal received by a charging device is used as the preferential charging power (which corresponds to the embodiment of FIG. 4), or a sum of a predetermined charging power for an electronic device corresponding to a preferential charging signal received by a charging device and a predetermined charging power for an electronic device with the highest predetermined charging power is calculated as the preferential charging power (which corresponds to the embodiment of FIG. 4), or a sum of predetermined charging powers for electronic devices with the lowest remaining power and the second lowest remaining power is calculated as the preferential charging power (which corresponds to the embodiment of FIG. 5), or a sum of predetermined charging powers for the first two electronic devices in a predetermined charging sequence is calculated as the preferential charging power (which corresponds to the embodiment of FIG. 6).

Next, as described in step S166, it is determined whether there is a remaining charging power greater than zero after subtracting the preferential charging power from the output power of the power source 20. If the remaining charging power is zero, the process goes forward to step S167 for charging only electronic devices earliest in the charging sequence. If there is a remaining charging power, the process goes forward to step S168 for charging electronic devices earliest in the charging sequence, and equally allocating the remaining charging power to other electronic devices for charging.

According to the charging devices 100 and 200 and the charging method provided in the disclosure, a plurality of electronic devices 32, 34, 36, and 38 is charged simultaneously, and an output power of a power source 20 is effectively used. In this way, through the charging devices 100 and 200 and the charging method provided in the disclosure, a charging power is effectively allocated to the electronic devices 32, 34, 36, and 38 to improve the charging efficiency and shorten a charging time.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A charging device, configured to be connected to a power source for charging a plurality of electronic devices, wherein each of the electronic devices comprises a predetermined charging power, and the charging device comprising:
- a power input end, configured to be connected to the power source;
- a plurality of power output ends, configured to be connected to the electronic devices;
- a plurality of charging units, electrically connected to the power output ends respectively for charging the electronic devices; and
- a controller, electrically connected to the power input end, the power output ends and the charging units for accessing an output power of the power source via the power input end and accessing the predetermined charging powers via the power output ends, and controlling the charging units according to the output power and the predetermined charging powers,
- wherein when the output power is less than a sum of the predetermined charging powers, the electronic device with a highest predetermined charging power among the plurality of electronic device is charged in first order,
- wherein when the output power is greater than the sum of the predetermined charging powers, the plurality of electronic devices are simultaneously charged, and
- wherein when the predetermined charging powers for the electronic devices are the same, actual charging powers for the electronic devices are adjusted according to remaining powers of the electronic devices, the output power is divided into a preferential charging power and a remaining charging power, and the preferential charging power is used for charging the electronic devices with a lowest remaining power and a second lowest remaining power.

2. The charging device according to claim 1, wherein the power source is an adaptor.

3. The charging device according to claim 1, wherein the power output end is a universal serial bus (USB) connecting port.

4. The charging device according to claim 1, wherein when the output power is less than the sum of the predetermined charging powers, the output power is divided into a preferential charging power and a remaining charging power, and the preferential charging power is used for charging the electronic device with the highest predetermined charging power.

5. The charging device according to claim 4, wherein the preferential charging power is equal to the highest predetermined charging power.

6. The charging device according to claim 5, wherein the remaining charging power is equally allocated to the electronic devices except the electronic device with the highest predetermined charging power.

7. The charging device according to claim 1, wherein when the predetermined charging powers for the electronic devices are the same and remaining powers of the electronic devices are the same, the controller controls the charging units to charge the electronic devices according to a predetermined charging sequence.

8. The charging device according to claim 7, wherein when the predetermined charging powers for the electronic devices are the same and the remaining powers of the electronic devices are the same, the output power is divided into a preferential charging power and a remaining charging power, and the preferential charging power is used for charging the first two electronic devices in the predetermined charging sequence.

9. The charging device according to claim 1, further comprising a control interface configured to receive a preferential charging signal, wherein the preferential charging signal corresponds to one of the electronic devices.

10. The charging device according to claim 9, wherein when the preferential charging signal is received, the electronic device corresponding to the preferential charging signal is preferentially charged.

11. A charging method, wherein a plurality of electronic devices is charged through a charging device using a power source, each of the electronic devices comprises a predetermined charging power, and the charging method comprising:
- accessing an output power of the power source;
- confirming the electronic devices that have been connected to the charging device and accessing the predetermined charging powers thereof; and
- adjusting actual charging powers for the electronic devices according to the output power and the predetermined charging powers,
- wherein when the output power is less than a sum of the predetermined charging powers, the electronic device with a highest predetermined charging power among the plurality of electronic devices is charged in first order,
- wherein when the output power is greater than the sum of the predetermined charging powers, the plurality of electronic devices are simultaneously charged, and
- wherein when the predetermined charging powers for the electronic devices are the same, actual charging powers for the electronic devices are adjusted according to remaining powers of the electronic devices, the output power is divided into a preferential charging power and a remaining charging power, and the preferential charging power is used for charging the electronic devices with a lowest remaining power and a second lowest remaining power.

* * * * *